United States Patent Office 2,917,527
Patented Dec. 15, 1959

2,917,527

PROCESS FOR THE MANUFACTURE OF TETRA-ETHYLLEAD AT ELEVATED TEMPERATURES

Walter E. Baumgartner, Waukegan, Ill., and Neal O. Brace, Wilmington, Del., assignors to E. I. du Pont de Nemours and Company, Wilmington, Del., a corporation of Delaware No Drawing. Application April 20, 1956
Serial No. 579,454

4 Claims. (Cl. 260—437)

The present invention is directed to a process for the manufacture of tetraethyllead from ethyl chloride and a sodium-lead alloy of the composition NaPb, and more particularly, to a continuous process for carrying out the manufacture of tetraethyllead at greatly elevated temperatures.

Tetraethyllead has been made commercially for about 30 years by the reaction $$4NaPb + 4EtCl \rightarrow PbEt_4 + 4NaCl + 3Pb$$

Over a period of time, this process has been improved in several respects, such as by the use of catalyst and by the direct introduction of molten alloy into liquid ethyl ch' -ide, thus making possible a continuous process. The 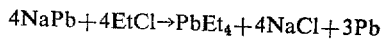 yields have remained much below 100%, based on sodium, the rate of reaction has remained lower than desired for continuous operation, undesirable side reactions occur to a substantial extent, and, the tetraethyllead, when made under conditions otherwise advantageous, often contains hexaethyldilead, $Pb_2Et_6$, which must be removed prior to use (see U.S.P. 2,571,987).

Prior art references have been limited by the belief that elevated temperatures cannot be used in the above-defined reaction. Efforts in the field of the production of tetraethyllead reflect general agreement that there is a definite temperature above which the reaction is impractical; this temperature is usually given as 100° C. as is represented in U.S. Patents 2,621,199, 2,635,106 and 2,727,052. Above this temperature it was firmly believed that the thermal decomposition of the tetraethyllead would substantially decrease the yield in addition to becoming explosive at higher temperatures. Furthermore, there was evidence that side reactions, such as $$2EtCl + 2NaPb \rightarrow Et_2 \text{ (butane)} + 2NaCl + 2Pb$$

would become important over 100° C. effecting a further reduction in the yield of tetraethyllead. U.S. Patent 2,635,106, above noted, states that "over 100° C. the yields fall off greatly owing to increased side reactions."

In U.S. application Ser. No. 189,531 of Schlaudecker, filed October 11, 1950 (now abandoned) and its continuation-in-part Ser. No. 538,330, filed October 4, 1955, now Patent No. 2,891,977, dated June 23, 1959, it is shown that the reaction temperature may be increased to about 120° C., contrary to the earlier statements, but it is stated that "at temperatures materially above 120° C., there is danger of decomposition of tetraethyllead and explosions."

The side reaction between ethyl chloride and the sodium-lead alloy forming butane and other gaseous hydrocarbons, given above, which takes place to an important extent in the manufacture of tetraethyllead as now carried out, is undesirable not only because it wastes alloy and ethyl chloride which would otherwise give tetraethyllead, but also because the butane generated forms an azeotrope with ethyl chloride. Consequently, the ethyl chloride in this azeotrope is lost with the butane unless recovered by a costly process of extraction with a solvent. Thus, an increase in the efficiency of the tetraethyllead reactions, that is, the ratio of the yield of tetraethyllead to the percentage of sodium consumed, would be desirable.

It is an object of this invention to produce tetraethyllead from ethyl chloride and a sodium-lead alloy continuously at greatly elevated temperatures effecting high yields. Another object of this invention is to effect improved reaction rate, high yield and efficiency of reaction, and, to avoid contamination by hexaethyldilead and serious decomposition of the tetraethyllead formed.

More specifically, the present invention is directed to the process of producing tetraethyllead by reacting sodium-lead alloy of the composition NaPb in the presence of an excess of liquid ethyl chloride at 130 to 160° C. and in the presence of at least 0.02 mol of acetone catalyst per mol of alloy, the molecular ratio of ethyl chloride to alloy being at least 6 to 1. The use of a catalyst is essential for the practical production of tetraethyllead at these high temperatures. Without a catalyst, such as acetone, at 130° C. only about 7% of the theoretical quantity of tetraethyllead is formed in 5 minutes and at 150°, only about 1% in 5 minutes. At 150° C. only 3.8% of the theoretical quantity of tetraethyllead is formed, and only 4.0% of the alloy is reacted in 30 minutes, indicating that the low yield is not due to decomposition of tetraethyllead already formed. This shows that, when it is attempted to increase the speed of the reaction as carried out by prior art temperatures below about 100° C., in the absence of catalyst, by the usual increase of temperature, the speed of the reaction actually decreases and approaches a very small value. This decrease was observed at temperatures somewhat above 100° C. in U.S. Patent 2,635,106 referred to, and together with the known tendency of tetraethyllead to decompose at high temperature channeled experimentation and research away from these high temperatures.

The difficulties resulting in operating at temperatures above 130° C. are overcome by the use of proper proportions of catalysts and ethyl chloride, said proportions being higher than those generally used in the prior art. Preferred conditions effecting highest yields and high rates and efficiencies of reaction depend on the temperature of reaction; thus at 130 to 136° C., 2 to 20 mol percent of acetone and 6 to 35 mols of ethyl chloride per mol of alloy are preferred. At 136 to 146° C., the preferred ranges are 3 to 15 mol percent and 10 to 35 mols of ethyl chloride. At 146 to 160° C., 5 to 15 mol percent of acetone and 20 to 30 mols of ethyl chloride per mol of alloy are preferred. In general, the best results with high yields are obtained under those conditions within the above-preferred ranges in which the lower, intermediate and higher proportions of acetone are used with the lower, intermediate and higher proportions, respectively, of the ethyl chloride.

The maximum yield at 130 to 160° C. is usually obtained within a heating time of 5 to 10 minutes, somewhat lesser time being required at the higher temperatures within this range. Since there is some decomposition of tetraethyllead particularly at the higher temperatures, the reaction should be stopped after this maximum yield is reached, although with the preferred proportions of ethyl chloride and acetone, considerably longer times do not lead to much decrease in yield. The decomposition observed at the higher temperatures is slow and is much less than would lead to explosion under the conditions defined. The variation of the yield with reaction time is illustrated by Examples 5, 6 and 7 to 10 which follow.

The alloy used should correspond closely to the composition NaPb (10% Na) and should be in the form of fairly small pieces. Although size is not critical, 10 to 40 mesh are convenient sizes. Furthermore, the reaction mass should be agitated at least enough to form a substantially uniform slurry of the dense alloy and lead reaction product in the liquid ethyl chloride. Although the examples given below are batch operations carried out over small scale under carefully controlled conditions, so as to bring out accurately the differences caused by variations in reaction conditions, the present invention is particularly suitable for continuous operation.

The present invention is discussed in terms of acetone as the catalyst; the acetone may be replaced in the present invention by catalysts, which are already known to affect favorably the reaction of sodium-lead alloy and ethyl chloride to form tetraethyllead, and which may be called generically "tetraethyllead catalysts." These include aldehydes, ketones, acetals, amides, esters, alcohols, and the like, usually of the aliphatic series. See U.S. Patents 2,464,397, 2,464,398, 2,464,399, 2,477,465, 2,515,821, and 2,657,225.

Hexaethyldilead, a troublesome by-product which must be absent from the tetraethyllead used in gasoline and which requires special treatment to remove it, is absent from the tetraethyllead made in high yields according to the present invention. It will be understood that the yield varies continuously with the proportions of catalysts and ethyl chloride and with the temperatures and time of reaction.

The following examples are illustrative of the present invention:

Examples

Monosodium-lead alloy (NaPb) was powdered in a box filled with dry nitrogen and loaded into glass ampoules which were sealed off under nitrogen, said ampoules being weighed accurately before and after filling. Mesh sizes 10–20 and 20–40 were used. The alloy was found to analyze correctly for active and total sodium (10.0% by weight), and to have the correct X-ray spectrum. Reaction of the alloy with ethyl chloride containing exactly known amounts of catalysts was carried out in nickel pressure vessels of 22 cc. capacity (Parr bombs, with polytetrafluoroethylene gaskets) which were loaded in a nitrogen or ethyl chloride atmosphere. The bombs also contained a 11/16" stainless steel ball for breaking the glass ampoule.

The bomb was brought to the desired temperature and given a smart rap to cause the ball to break the ampoule. The bomb was then immediately tumbled end over end at the desired rate per minute, usually 80 or 160 r.p.m., in a constant temperature bath for a time period accurately controlled. To quench the reaction, the bomb and contents were immediately cooled in a bath of acetone and solid carbon dioxide.

The amount of tetraethyllead formed, the sodium and lead consumed, and sodium chloride produced were determined by appropriate analytical methods.

The following examples illustrate the results obtained when operating according to the present invention. It should be pointed out that these do not in every case use the particularly preferred conditions and hence do not always give yields as high as are obtained, using these particularly preferred conditions. Thus some examples are included to show how variations in conditions, within the definition of the invention, affect the yield.

Examples 1 to 4 show the effect of changing the ethyl chloride to alloy reactant ratio with corresponding changes in the acetone/alloy ratio on the yield of tetraethyllead and efficiency of alloy utilization $\left(\dfrac{\text{yield of tetraethyllead}}{\text{consumption of alloy}}\right)$ for five-minute reactions at 130° C.

| Ex. No. | Temp., °C. | Time, Min. | Mols of Acetone/ 100 Mols of alloy | Mols of EtCl/ Mols of alloy | Tetraethyl lead Yield (Percent) | Efficiency (Percent) |
| --- | --- | --- | --- | --- | --- | --- |
| 1 | 130 | 5.0 | 13.8 | 31.0 | 89.9 | 97.6 |
| 2 | 130 | 5.0 | 3.2 | 14.2 | 89.0 | 95.7 |
| 3 | 130 | 5.0 | 3.2 | 8.0 | 88.5 | 93.0 |
| 4 | 130 | 5.0 | 1.3 | 5.0 | 85.6 | |

It is apparent the highest yield and efficiency results when the higher reactant ratios are employed. Example 4, which is outside the scope of the invention, is included to show the effect of further lowering of the acetone ratio.

Examples 5 and 6 show the effect of increasing reaction time on yield of tetraethyllead and efficiency at 130 to 134° C. at lower ethyl chloride to alloy ratios.

| Ex. No. | Temp., °C. | Time, Min. | Mols of Acetone/ 100 Mols of alloy | Mols of EtCl/ Mols of alloy | Tetraethyl lead Yield (Percent) | Efficiency (Percent) |
| --- | --- | --- | --- | --- | --- | --- |
| 5 | 134 | 6.0 | 4.3 | 5.0 | 86.3 | 90.1 |
| 6 | 130 | 10.0 | 3.2 | 6.3 | 89.3 | 93.3 |

At an ethyl chloride to alloy ratio of 12.6 to 13.5 with adequate catalyst concentration, the change in yield of tetraethyllead and efficiency with reaction time of 6 to 30 minutes at 130 to 134° C. is given in Examples 7 to 10. A very high yield of tetraethyllead is readily obtained under these conditions.

| Ex. No. | Temp., °C. | Time, Min. | Mols of Acetone/ 100 Mols of alloy | Mols of EtCl/ Mols of alloy | Tetraethyl lead Yield (Percent) | Efficiency (Percent) |
| --- | --- | --- | --- | --- | --- | --- |
| 7 | 130 | 6.0 | 4.3 | 13.5 | 90.0 | 95.0 |
| 8 | 130 | 7.5 | 3.6 | 13.6 | 91.2 | 95.0 |
| 9 | 134 | 8.8 | 4.3 | 13.5 | 90.2 | 93.0 |
| 10 | 130 | 30.0 | 3.9 | 12.6 | 87.6 | 90.4 |

At 140° C. reaction times of 5 to 7.8 minutes and ethyl chloride ratios of 29.6 to 15.5 gave nearly the same tetraethyllead yield, but the lower reactant ratio gave the lower efficiency of reaction (Examples 11 and 12; compare with Examples 7 and 8).

| Ex. No. | Temp., °C. | Time, Min. | Mols of Acetone/ 100 Mols of alloy | Mols of EtCl/ Mols of alloy | Tetraethyl lead Yield (Percent) | Efficiency (Percent) |
| --- | --- | --- | --- | --- | --- | --- |
| 11 | 140 | 5.0 | 13.1 | 29.6 | 88.2 | 94.0 |
| 12 | 140 | 7.8 | 3.6 | 13.6 | 88.8 | 91.8 |

At a high ethyl chloride to alloy reactant ratio (26.0 to 31.9 mols) at 148° to 150°, with optimum acetone catalyst level, a very high yield of tetraethyllead can be obtained in five to eight minutes as shown in Examples 13 to 15.

| Ex. No. | Temp., °C. | Time, Min. | Mols of Acetone/ 100 Mols of alloy | Mols of EtCl/ Mols of alloy | Tetraethyl lead Yield (Percent) | Efficiency (Percent) |
| --- | --- | --- | --- | --- | --- | --- |
| 13 | 148 | 4.0 | 6.3 | 26.0 | 88.8 | 96.0 |
| 14 | 150 | 5.0 | 11.7 | 31.9 | 91.5 | 96.6 |
| 15 | 148 | 8.0 | 6.3 | 26.0 | 92.0 | 94.4 |

Essentially the same yield and efficiency are obtained at 160° C.:

| Ex. No. | Temp., °C. | Time, Min. | Mols of Acetone/ 100 Mols of alloy | Mols of EtCl/ Mols of alloy | Tetra- ethyl lead Yield (Percent) | Effi- ciency (Percent) |
|---|---|---|---|---|---|---|
| 16 | 160 | 5.0 | 12.5 | 28.1 | 84.1 | 98.0 |

The reasons for the superior results which are obtained when optimum reactant and catalyst ratios are used at these high reaction temperatures have not been clearly defined. We are quite certain that an intrinsic improvement in the reaction itself results from the use of the preferred reaction conditions, rather than the possible effect of merely stabilizing the sensitive tetraethyllead product once formed.

The above examples reflect a significant advance in the are concerned with the maufacture of tetraethyllead. This high temperature process effects a high yield and results in a non-contaminated tetraethyllead product in high efficiency.

We claim:

1. A process for the manufacture of tetraethyllead wherein a sodium-lead alloy of the composition NaPb is reacted with an excess of liquid ethyl chloride at a temperature within the range of 130 to 160° C. in the presence of from at least 0.02 mol to 20 mols of lead alkylating catalyst per mol of said alloy, the molecular ratio of ethyl chloride to alloy being within the range of at least 6:1 to 35:1.

2. A process for the manufacture of tetraethyllead wherein a sodium-lead alloy of the composition NaPb is reacted with 6 to 35 mols of ethyl chloride per mol of alloy at a temperature within the range of 130 to 136° C. in the presence of 2 to 20 mol percent of acetone catalyst per mol of alloy.

3. A process for the manufacture of tetraethyllead wherein a sodium-lead alloy of the composition NaPb is reacted with 10 to 35 mols of ethyl chloride per mol of alloy at a temperature within the range of 136 to 146° C. in the presence of 3 to 15 mol percent of acetone catalyst per mol of alloy.

4. A process for the manufacture of tetraethyllead wherein a sodium-lead alloy of the composition NaPb is reacted with 20 to 35 mols of ethyl chloride per mol of alloy at a temperature within the range of 146 to 160° C. in the presence of 5 to 15 mol percent of acetone catalyst per mol of alloy.

References Cited in the file of this patent

UNITED STATES PATENTS

| | | |
|---|---|---|
| 2,464,397 | Holbrook | Mar. 15, 1949 |
| 2,660,596 | Calingaert | Nov. 24, 1953 |
| 2,668,628 | Shapiro et al. | Sept. 7, 1954 |
| 2,727,052 | Madden et al. | Dec. 13, 1955 |
| 2,727,053 | Krohn | Dec. 13, 1955 |

OTHER REFERENCES

Leeper et al.: Chem. Rev. 54, 101 (1954).

UNITED STATES PATENT OFFICE

CERTIFICATE OF CORRECTION

Patent No. 2,917,527                                        December 15, 1959

Walter E. Baumgartner et al

It is hereby certified that error appears in the printed specification of the above numbered patent requiring correction and that the said Letters Patent should read as corrected below.

Column 5, line 19, for "are" read -- art --; column 6, line 24, list of references cited, under the heading "UNITED STATES PATENTS", for the patent number "2,668,628" read -- 2,688,628 --.

Signed and sealed this 31st day of May 1960.

(SEAL)
Attest:

KARL H. AXLINE                                       ROBERT C. WATSON
Attesting Officer                                  Commissioner of Patents